T. W. EPLING.
DERAILER FOR RAILWAYS.
APPLICATION FILED MAY 20, 1908.
916,851.
Patented Mar. 30, 1909.
2 SHEETS—SHEET 1.
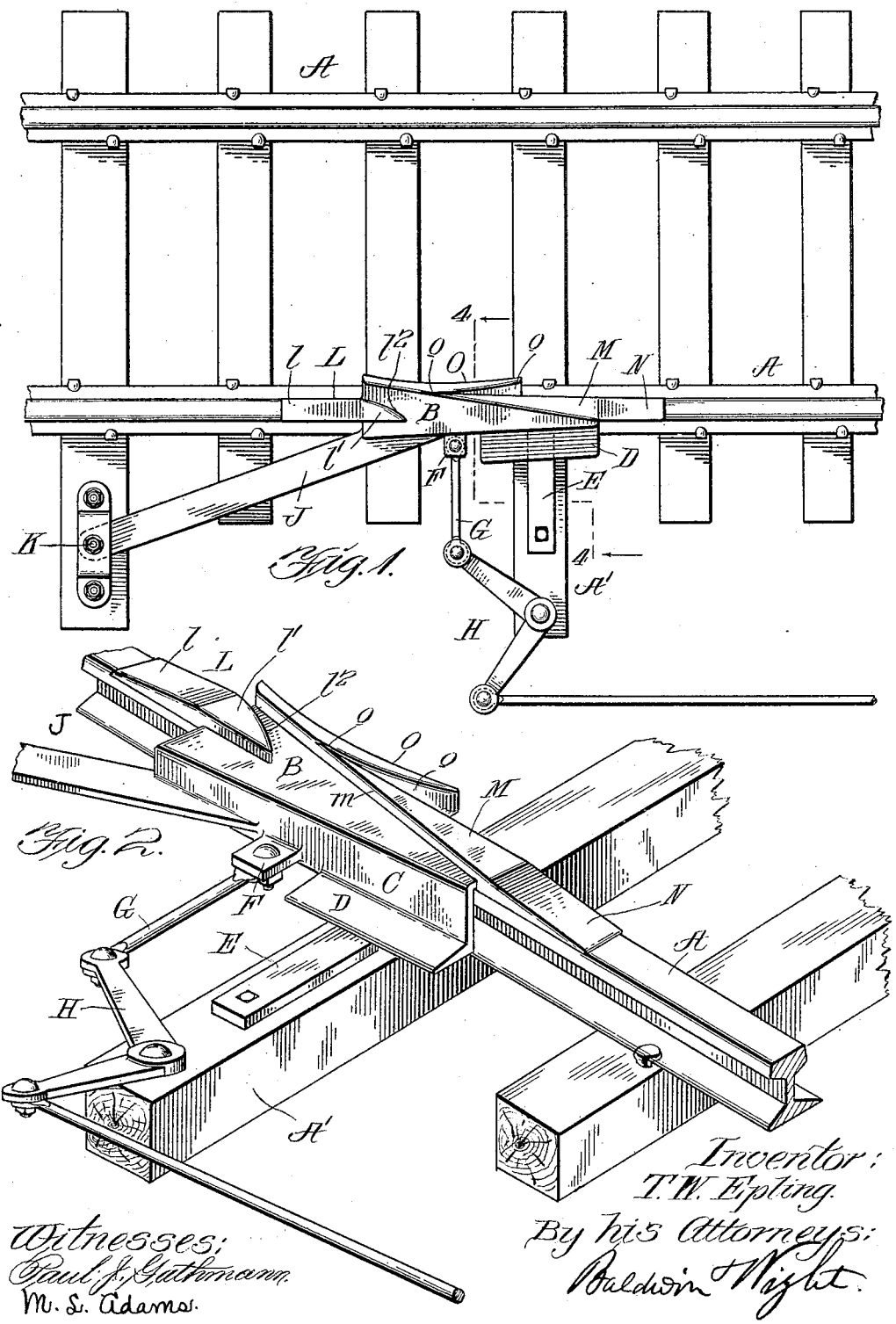
Inventor:
T. W. Epling.
By his Attorneys:
Baldwin & Wight
Witnesses:
Paul J. Gathmann.
M. S. Adams.

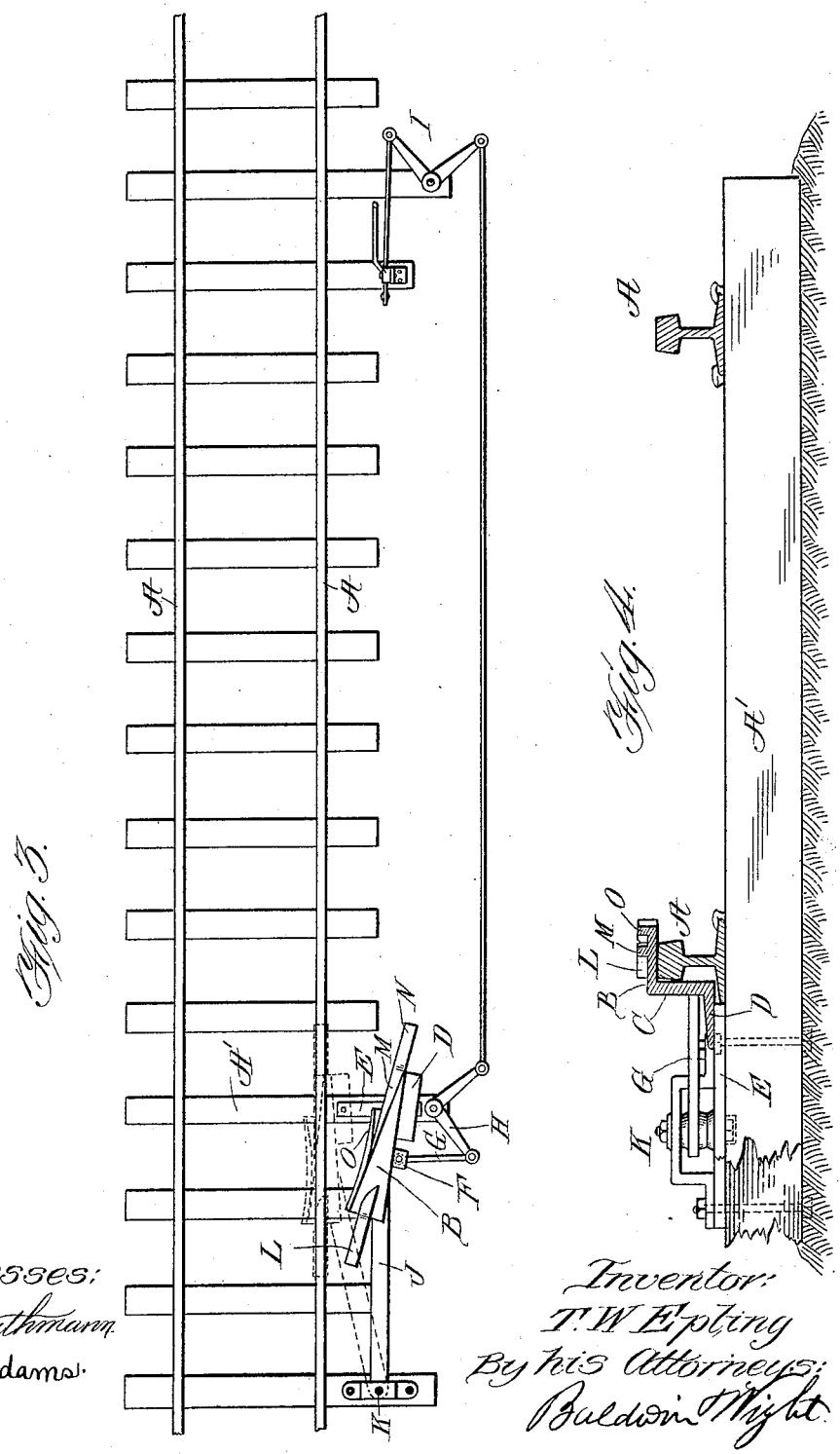

UNITED STATES PATENT OFFICE.

TAYLOR W. EPLING, OF ROANOKE, VIRGINIA, ASSIGNOR OF ONE-HALF TO JOHN W. ALEXANDER, OF ROANOKE, VIRGINIA.

DERAILER FOR RAILWAYS.

No. 916,851.　　　Specification of Letters Patent.　　　Patented March 30, 1909.

Application filed May 20, 1908. Serial No. 433,838.

*To all whom it may concern:*

Be it known that I, TAYLOR W. EPLING, a citizen of the United States, residing in Roanoke, in the county of Roanoke and State of Virginia, have invented certain new and useful Improvements in Derailers for Railways, of which the following is a specification.

My invention relates to that class of railway switches known as derailers which are constructed to enable a car to be readily removed from a track when desired and which will cause the car to leave the track should it be accidentally moved out of the position in which it has been placed.

The object of my invention is to provide a derailer of simple construction which may be easily operated and which is so formed that when it is set, a car moving over it in one direction will be derailed, while a car passing over it in the other direction will not be derailed.

In carrying out my invention I provide a derailing switch comprising a base plate adapted to rest on one of the rails and having a downwardly extending flange secured to a pivoted lever connected with operating devices in such manner that the derailer may be quickly and easily moved over or away from the track. The base plate is provided at one end with a tread portion, the outer end of which is beveled or inclined, the top of which is above the base plate and the inner edge of which is so inclined as to guide the wheel flange across the rail to the outside thereof. The base also carries a guide flange which extends from the inner side of the plate at that end where the tread portion is located to the outer edge of the opposite end of the plate where it joins a beveled or inclined tread portion arranged to rest on the rail. This guide flange is provided with an extension having a groove on its upper side in line with the inner edge of the rail permitting a car after passing the derailer in one direction to remain on the track.

In the accompanying drawings,—Figure 1 is a plan view of my improved derailer applied to a railway track. Fig. 2 is a perspective view thereof. Fig. 3 is a plan view of the same showing the operating means. Fig. 4 shows a transverse section on the line 4—4 of Fig. 1.

The rails A of the track are of the usual form. The derailer may be located at any desired position on the track where it is desired to derail cars, but I especially intend it for use on side tracks in car yards where cars are liable to stand and where it is sometimes desirable to remove a car from the track in order to take out another car or put a car in its place.

The derailer comprises a base plate B having a downwardly extending flange C formed with a lateral projection D resting and sliding on a plate E attached to one of the cross ties A'. The flange C is also formed with a laterally projecting lug F connected by a link G with a bell crank lever H which may be connected with a switch I, in the manner shown, but any other suitable mechanism may be employed for moving the derailer which, as shown, is secured to a lever J pivoted at K outside the track to one of the cross ties. The base plate B, when in place on a rail, as shown in Figs. 1 and 2, lies close to the top thereof, while the flange C lies close to the outside of the rail. By operating the levers H, etc., the derailer may be placed in such position, or withdrawn therefrom at will.

The base plate is provided at one end with a tread portion L, on which the tread of a wheel may bear when entering the derailer, and the tread portion projects from the end of the derailer and is beveled or inclined as shown at $l$ from its outer end to its top portion $l'$, which is raised above the plane of the base B. The inner edge $l^2$ of the inner portion of the tread portion L is inclined or curved from its inner side forwardly and outwardly to the opposite side providing a guide surface for the flange of the wheel while being derailed.

The base plate also carries a guide flange M which is raised above the plane of the base and extends from the inner edge thereof next the tread portion L in a diagonal direction to the opposite end of the base, providing a guide surface $m$ for the wheel flange. This flange M connects with a tread portion N which projects outwardly from the end of the base and is inclined from its outer end inwardly and upwardly to the top of the flange. The flange M is provided with a branch portion O having a grooved portion $o$ to receive the flange of a wheel and permitting the wheel to pass over the derailer without being derailed. The branch portion O is raised above the plane of the base plate B and it is curved or inclined in opposite direction from its middle portion inwardly toward the middle of the track. At one end it serves to guide the flange of the wheel into engagement with the guiding surface $m$, while at the opposite end it guides the flange of the wheel into the grooved portion at the inner end of the flange M.

A wheel entering the derailer at L will be raised above the plane of the track and will be guided laterally across the base plate to the outside, other following wheels will move in the same way, and thus a car would be derailed. The guide surface $m$ of the flange M is quite gradual and hence the car is not jerked suddenly to one side but is removed gradually from the track.

The derailer is so arranged that when set, it will permit cars to be derailed when passing in one direction, but will prevent the derailment of cars when passing in the opposite direction. This is often desirable. It will be readily seen that cars entering at M will be guided over the derailer without danger of jumping the track.

I claim as my invention:—

A derailer comprising a base portion adapted to rest on a rail and formed with a downwardly extending flange, adapted to rest against the outer side of the rail and which has at its lower end a laterally projecting portion adapted to rest on the tie, a lever secured to said downward projecting flange and pivoted outside the track, means outside the track for operating the lever to swing the derailer into position over the track and to withdraw it therefrom, tread portions at opposite ends of the derailer having inclined entering portions, one of which has an inclined surface for deflecting a wheel, while the other has on one side a long diagonally arranged guiding surface and a flanged branch portion inclined from its central portion in opposite directions inwardly toward the center of the track and which joins the inner end of one of the tread portions and has a groove between said inner end of the tread portion and its middle portion for the purpose specified.

In testimony whereof, I have hereunto subscribed my name.

TAYLOR W. EPLING.

Witnesses:
L. A. TROUT,
W. L. ANDREWS.